United States Patent
Sahashi et al.

(10) Patent No.: US 12,469,620 B2
(45) Date of Patent: Nov. 11, 2025

(54) INSULATED ELECTRIC WIRE AND WIRING HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Kyoma Sahashi, Yokkaichi (JP); Toyoki Furukawa, Yokkaichi (JP); Yoshitaka Yamada, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 143 days.

(21) Appl. No.: 18/281,730

(22) PCT Filed: Mar. 25, 2022

(86) PCT No.: PCT/JP2022/014293
§ 371 (c)(1),
(2) Date: Sep. 12, 2023

(87) PCT Pub. No.: WO2022/210331
PCT Pub. Date: Oct. 6, 2022

(65) Prior Publication Data
US 2024/0145123 A1  May 2, 2024

(30) Foreign Application Priority Data
Mar. 31, 2021  (JP) .................... 2021-060353

(51) Int. Cl.
*H01B 7/08* (2006.01)
*H01B 7/00* (2006.01)

(52) U.S. Cl.
CPC ......... *H01B 7/0876* (2013.01); *H01B 7/0009* (2013.01); *H01B 7/0045* (2013.01)

(58) Field of Classification Search
CPC ......... H01B 1/023; H01B 1/026; H01B 5/08; H01B 7/0009; H01B 7/0045; H01B 7/02;
(Continued)

(56) References Cited

U.S. PATENT DOCUMENTS 9,889,805 B2 * 2/2018 Yanazawa ............ H02G 3/0468
10,964,446 B2 * 3/2021 Ooi ........................... H01B 7/08
(Continued)

FOREIGN PATENT DOCUMENTS

JP   2014-130739 A   7/2014
JP   2019-149242 A   9/2019
(Continued)

OTHER PUBLICATIONS

Feb. 10, 2025 U.S. Office Action issued in U.S. Appl. No. 18/281,757.
(Continued)

*Primary Examiner* — William H. Mayo, III
(74) *Attorney, Agent, or Firm* — Oliff PLC

(57) ABSTRACT

An insulated electric wire includes a flat portion and a low-flatness portion along an axial direction x, having elemental wires constituting a conductor and an insulation coating being continuous with one another. An outer shape of the conductor of the flat portion in a cross-section perpendicular to the axial direction x of the insulated electric wire takes a flat shape, and an outer shape of the conductor of the low-flatness portion takes a shape with flatness lower than the flat portion. In each of the cross-sections of the conductor of the flat portion and the low-flatness portion, (Continued)

deformation ratios of the elemental wires from a circle at width directional end parts, which corresponds to regions facing an outer periphery of the conductor at both ends of the flat shape in a width direction, are lower than the deformation ratios of the elemental wires at a center parts of the conductor.

12 Claims, 7 Drawing Sheets

(58) Field of Classification Search
CPC ... H01B 7/04; H01B 7/06; H01B 7/08; H01B 7/29; H01B 7/292; H01B 7/303; H01B 7/36; H01B 13/00; H01B 13/0006; F16L 55/00; H02G 1/08; H02G 3/04; H02G 3/0468; H02G 3/0487
USPC ............... 174/36, 72 R, 74 A, 72 B, 72 TR, 174/110 R–112; 138/103
See application file for complete search history.

(56) References Cited

U.S. PATENT DOCUMENTS

| | | | | |
|---|---|---|---|---|
| 2013/0248038 | A1* | 9/2013 | Aoyama | B60R 16/0215 138/103 |
| 2015/0274095 | A1* | 10/2015 | Inao | H02G 3/0468 174/72 A |
| 2016/0133356 | A1* | 5/2016 | Kondo | H01B 13/0006 174/72 A |
| 2019/0259511 | A1* | 8/2019 | Ooi | H01B 7/04 |
| 2020/0335240 | A1 | 10/2020 | Ooi et al. | |
| 2021/0050128 | A1 | 2/2021 | Sahashi et al. | |
| 2021/0193348 | A1 | 6/2021 | Ooi et al. | |

FOREIGN PATENT DOCUMENTS

| | | | | |
|---|---|---|---|---|
| JP | 2020077499 A | * | 5/2020 | ............... H01B 7/04 |
| WO | 2019/093309 A1 | | 5/2019 | |
| WO | 2019/093310 A1 | | 5/2019 | |
| WO | 2019/177016 A1 | | 9/2019 | |

OTHER PUBLICATIONS

Jun. 7, 2022 Search Report issued in International Patent Application No. PCT/JP2022/041294.

Jun. 7, 2022 Search Report issued in International Patent Application No. PCT/JP2022/014293.

U.S. Appl. No. 18/281,757, filed Sep. 12, 2023 in the name of Yoshitaka Yamada et al.

* cited by examiner

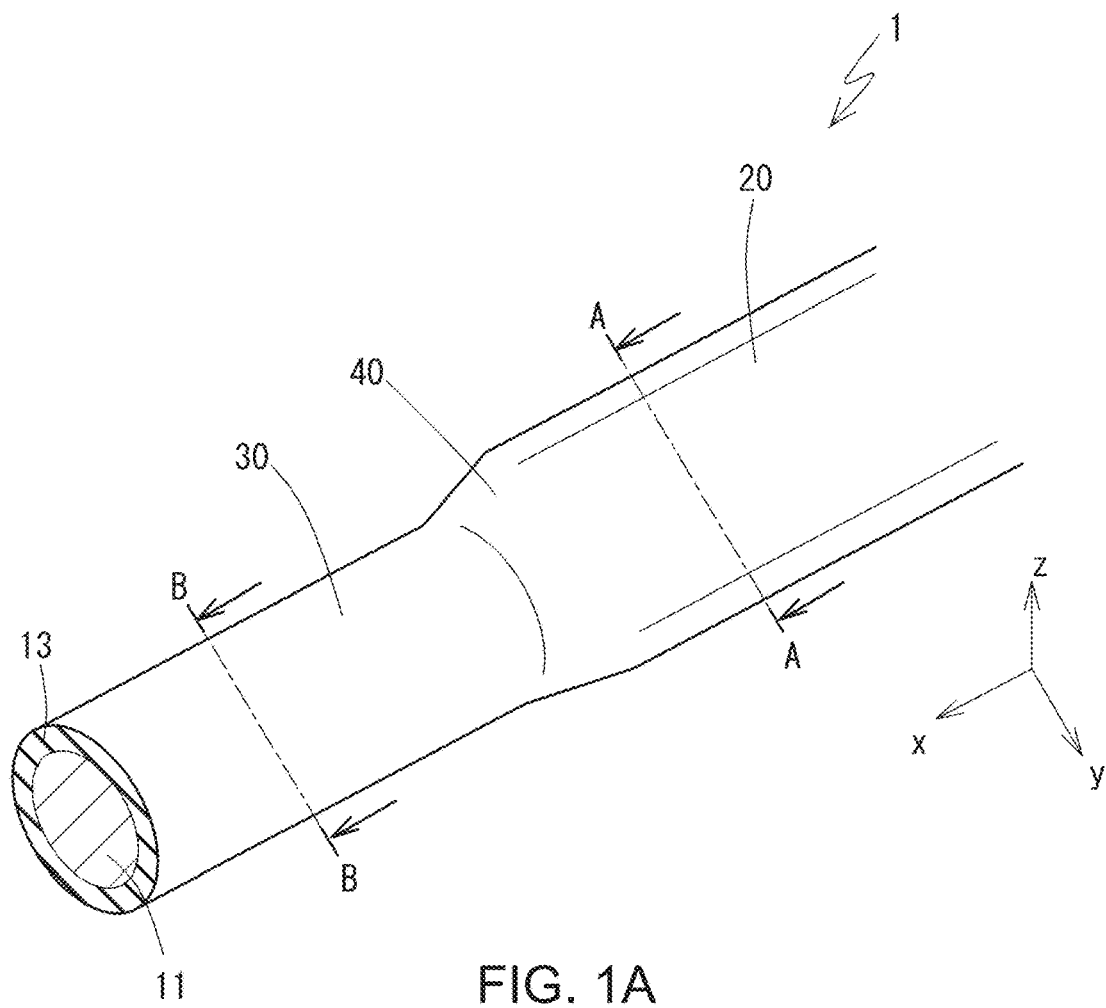
FIG. 1A
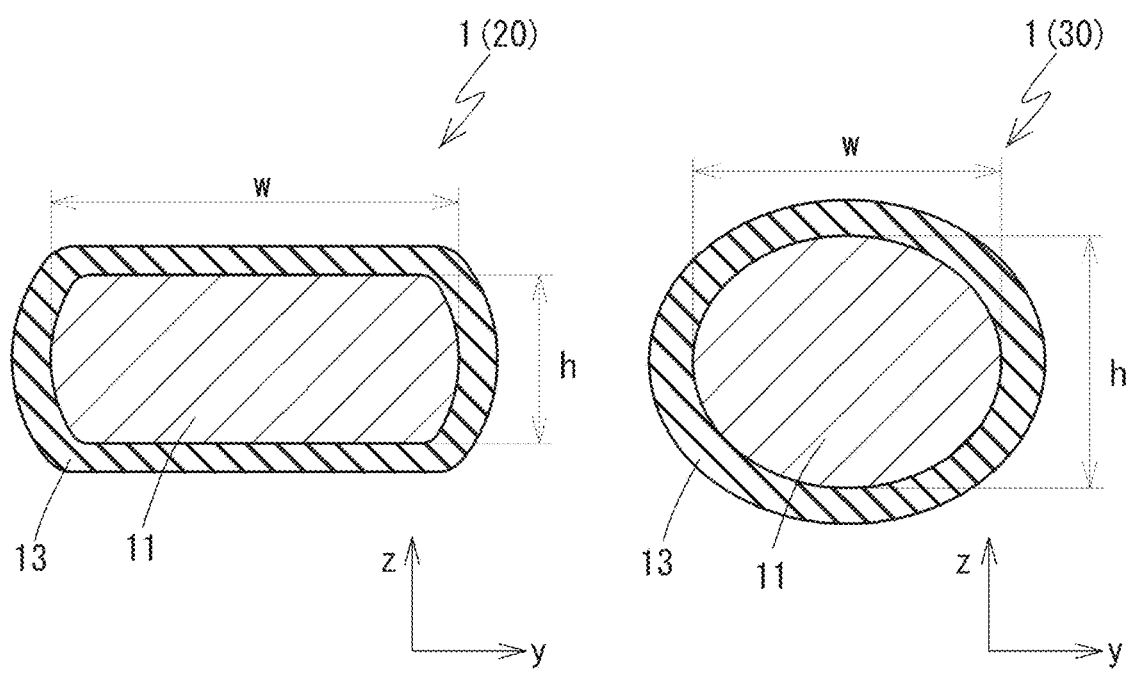
FIG. 1B
FIG. 1C

A

B

A

B

C

A

B

INSULATED ELECTRIC WIRE AND WIRING HARNESS

TECHNICAL FIELD

The present invention relates to an insulated electric wire and a wiring harness.

BACKGROUND ART

A flat electric wire containing a flat-shaped conductor has been known. A flat electric wire occupies a smaller space for routing than a conventional electric wire including a conductor having a substantially circular cross-section.

In a conventional flat electric wire, a flat rectangular conductor is often used as a conductor as disclosed in Patent Literatures 1, 2. The flat rectangular conductor is made of a single metal wire formed to have a rectangular cross-section. Patent Literatures 3 to 5 applied by the present applicants, disclose an electric wire conductor in which a twisted wire obtained by twisting a plurality of elementary wires together is made into a flat shape from the view point of achieving both flexibility and space-saving property.

CITATION LIST

Patent Literature

PTL1: JP 2014-130739 A
PTL2: JP 2019-149242 A
PTL3: International Publication WO 2019/093309
Patent Literature 4: International Publication WO 2019/093310
Patent Literature 5: International Publication WO 2019/177016

SUMMARY OF INVENTION

Technical Problem

As disclosed in Patent Literatures 3 to 5, an insulated electric wire having a flat twisted wire obtained by twisting a plurality of elemental wires together into a flat outer shape as a conductor is excellent in both space-saving property and flexibility. The flat twisted wire exhibits significantly high flexibility upon bending in a height direction (flat direction) of the flat shape, while having a tendency to exhibit a lower flexibility than in the height direction upon bending in a width direction (edgewise direction) of the flat shape. The insulated electric wire provided with the flat twisted wire can be suitably used for routing in various types of spaces such as a narrow space by utilizing the space-saving property and flexibility in the height direction of the flat twisted wire. Meanwhile, when using the insulated electric wire with the flat twisted wire for an application which involves complicated bending such as a three-dimensional routing, the bending flexibility exhibiting only in the height direction cannot cope with the complicated bending for wiring routing.

In order to sufficiently cope with the complicated bending, the flat twisted wire is required to be bent in the width direction as well, but as mentioned above, bending the flat twisted wire in the width direction is less flexible than bending in the height direction. Therefore, in a field of an electric wire for automotive, for example, it is desirable to develop an insulated electric wire that can sufficiently cope with the complicated bending, such as the three-dimensional routing, while using the space-saving property of the flat twisted wire. In particular, as the cross-sectional area of the conductor increases to allow the insulated electric wire to cope with large current application, the flexibility of the conductor is likely to be lowered; however, it is preferable for the insulated electric wire including the conductor with large cross-sectional area to cope with the complicated bending while securing the space-saving property.

In view of the above, an object is to provide an insulated electric wire that can be flexibly bent into a complicated shape while including a flat portion having a conductor with a flat-shaped cross-section, and a wiring harness including the insulated electric wire.

Solution to Problem

An insulated electric wire according to a first embodiment of the disclosure includes a conductor comprising a plurality of elemental wires twisted together, and an insulation coating covering an outer periphery of the conductor, wherein the insulated electric wire includes a flat portion and a low-flatness portion along an axial direction of the insulated electric wire, where the plurality of elemental wires and the insulation coating are each continuous through these portions; the conductor has, in a cross-section perpendicular to an axial direction, a flat outer shape in the flat portion and a less flat outer shape in the low-flatness portion than in the flat portion in the insulated electric wire; in the cross-sections of the conductor for both of the flat and the low-flatness portions, deformation ratios of the elemental wires at width-directional end parts, which correspond to regions facing an outer periphery of the conductor at both ends of the flat shape in a width direction, are lower than the deformation ratios of the elemental wires at center parts of the conductor.

The insulated electric wire according to a second embodiment of the disclosure is manufactured by steps of: making an insulated electric wire by compressing a conductor in which a plurality of elemental wires are twisted together into a flat shape and by covering the outer periphery of the conductor with an insulation coating; thereafter forming a low-flatness portion by applying a force to the insulated electric wire from outside to inside in a width direction of the flat shape in a partial region along an axial direction of the insulated electric wire to reduce the degree of flatness of the conductor; and leaving a region other than the partial region formed into the low-flatness portion as a flat portion.

The wiring harness of the disclosure includes the insulated electric wire.

Advantageous Effects of Invention

According to the disclosure, an insulated electric wire can be flexibly bent into a complicated shape while including a flat portion having a conductor with a flat shaped cross-section, and a wiring harness includes the insulated electric wire as described above.

BRIEF DESCRIPTION OF DRAWINGS

FIG. 1A to FIG. 1C schematically illustrate an insulated electric wire according to an embodiment of the disclosure. FIG. 1A is a perspective view. FIG. 1B is a sectional view illustrating a flat portion corresponding to a cross-section taken along line A-A of FIG. 1A, and FIG. 1C is a sectional view illustrating a low-flatness portion corresponding to a cross-section taken along line B-B of FIG. 1A. In the respective drawings, elemental wires constituting the conductor are omitted.

DESCRIPTION OF EMBODIMENTS

Description of Embodiment of Disclosure

Figure 2:
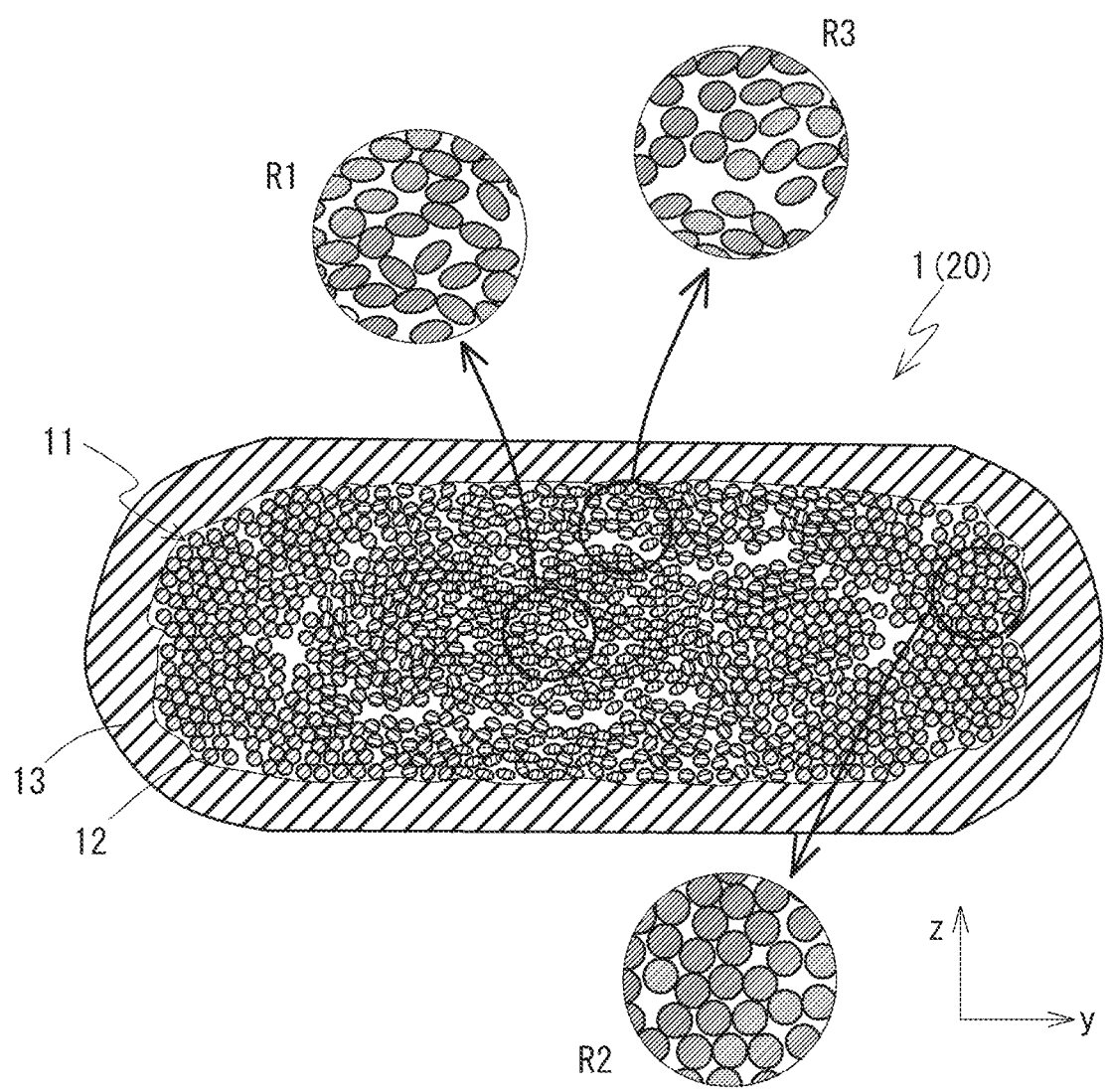
FIG. 2 is a sectional view of the flat portion of the insulated electric wire, and enlarged regions R1 to R3 surrounded by circles, respectively.

An embodiment of the disclosure will be described.

The insulated electric wire according to the first embodiment of the disclosure includes a conductor comprising a plurality of elemental wires twisted together; and an insulation coating covering an outer periphery of the conductor, wherein the insulated electric wire comprises a flat portion and a low-flatness portion along an axial direction of the insulated electric wire, where the plurality of elemental wires and the insulation coating are each continuous through these portions; the conductor has, in a cross-section perpendicular to the axial direction, a flat outer shape in the flat part and a less flat outer shape in the low-flatness portion than in the flat portion in the insulated electric wire; in the cross-sections of the conductor for both of the flat and the low-flatness portions, deformation ratios of the elemental wires at width-directional end parts, which correspond to regions facing the outer periphery of the conductor at both ends of the flat shape in a width direction, are lower than the deformation ratios of the elemental wires at center parts of the conductor.

The insulated electric wire includes a conductor having, in succession, a flat portion that takes a flat outer shape and a low-flatness portion that takes a shape of a small flatness. In the low-flatness portion, the conductor has a low degree of flatness, and a difference in flexibility according to bending directions becomes smaller than the flat portion, whereby flexible bending is allowed in each direction including the width direction of the flat shape. Accordingly, the insulated electric wire described above is allowed to be bent flexibly into a complicated shape such as a three-dimensional routing, using the low-flatness portion. Using a bending flexibility of the low-flatness portion in each direction and a bending flexibility and a space-saving property of the flat portion, the insulated electric wire excellent in the degree of freedom in bending and the space-saving property is prepared. It is possible to use such insulated electric wire in an area with limited space, which needs the complicated routing for the complicated path, for example, the inner space of the automobile.

Further, in the flat portion and the low-flatness portion of the insulated electric wire, deformation ratios of the elemental wires from a circle at width-directional end parts of the conductor are lower than the deformation ratios of the elemental wires at the center parts of the conductor. In this way, it is possible to easily form the insulated electric wire by making an insulated electric wire compressing a conductor into a flat shape, thereafter forming a low-flatness portion by applying a force from outside in a width direction of the flat shape of the conductor to reduce the degree of flatness of the conductor, the insulated electric wire having the deformation ratios of the elemental wires at width-directional end parts of the conductor lower than the center parts of the conductor at both the flat portion and the low-flatness portion. The insulated electric wire can be routed in various spaces into various shapes by forming the low-flatness portion in this method while securing the space-saving property and the bending flexibility.

Here, it is preferable that, in the cross-sections of the conductor for both of the flat and the low-flatness portions, the deformation ratios of the elemental wires from the circle at the width-directional end parts are lower than the deformation ratios of the elemental wires at height-directional end parts, which correspond to regions facing the outer periphery of the conductor at both ends of the flat shape in a height direction. Further, it is preferable that, in the low-flatness portion, the deformation ratios of the elemental wires from the circle at the width-directional end parts are 70% or lower than the deformation ratios at the center parts. As mentioned above, by using the insulated electric wire in which the conductor is compressed into the flat shape, as a base material, and forming the low-flatness portion in a region of the insulated electric wire, it is possible to easily obtain the insulated electric wire including the low-flatness portions where the deformation ratios of the elemental wires at the width-directional end parts of the conductor is lower than that at both center parts and the height-directional end parts, and where the deformation ratios of the elemental wires at the width-directional end parts are significantly lower than that at the center parts.

In the low-flatness portion, the deformation ratios of the elemental wires from the circle at the center parts are preferably 5% or higher. By increasing the deformation ratios of the elemental wires at the center parts of the conductor to be 5% or higher, for example, the conductor is allowed to be efficiently formed into the flat shape. When applying a force to deform the flat-shaped conductor to form the low-flatness portion, the elemental wires having the deformation ratios of 5% or higher remain even in the low-flatness portion at the center parts of the conductor.

In the low-flatness portion, a vacancy ratio in the low-flatness portion is higher than the vacancy ratio in the flat portion, defining that the vacancy ratio is a proportion of an area of vacancy not occupied by the elemental wires to an area of a region surrounded by an inner periphery of the insulation cover in the cross-section. The vacancy generated around the conductor or between the elemental wires may assist the conductor in flexible bending. The low-flatness portion has the vacancy larger than the flat portion so that flexibility in the low-flatness portion can be enhanced. When deforming the insulated electric wire having the conductor formed into the flat shape by applying a force to produce the low-flatness portion, the conductor is deformed into the low-flatness shape in the space where the peripheral length is defined by the inner peripheral surface of the insulation coating, whereby the proportion of the vacancy is increased in the conductor.

In the cross-section, difference in length of the outer periphery of the conductor between the flat portion and the low-flatness portion is preferably within 5% of the length of the outer periphery of the conductor in the flat portion. When deforming the insulated electric wire having the conductor formed into the flat shape by applying force to produce the low-flatness portion, change in the outer peripheral length of the conductor is limited by the inner peripheral surface of the insulation coating. Accordingly, it is possible to easily manufacture the insulated electric wire in which the difference in the outer peripheral length of the conductor between the flat portion and the low-flatness portion is suppressed to be 5% or less of the outer peripheral length of the conductor in the flat portion by using the insulated electric wire having the conductor entirely formed into the flat shape as the base material.

The insulation cover is preferably adhered to the outer periphery of the conductor in both the flat and low-flatness portions. Upon heat generated by current application to the conductor, the insulation coating adhered to the outer periphery of the conductor may enhance dissipation of heat both in the flat portion and the low-flatness portion via the insulation coating. The heat dissipation upon current application is especially essential for the insulated electric wire having the conductor with large cross-sectional area for large current application. When deforming the insulated electric wire having the conductor entirely formed into the flat shape by applying a force to form the low-flatness portion, the vacancy is likely to be generated between the conductor and the insulation coating in the low-flatness portion; however, the area including the formed low-flatness portion is heated to soften or melt the formed insulation coating temporarily so that the insulation coating can be brought into tight contact with the outer periphery of the conductor.

In this case, the insulated electric wire has a transition region where an outer shape of the conductor changes continuously inclining between the flat and low-flatness portions, and the insulation cover is adhered to the outer periphery of the conductor in the transition region. This makes it possible to facilitate heat dissipation upon current application in the transition region between the flat portion and the low-flatness portion. As each shape of the conductor and the insulation coating gradually changes between the flat portion and the low-flatness portion, load or stress exerted to the conductor and the insulation coating is unlikely to be generated compared with the case of abrupt stepwise change. The use of the transition region facilitates provision of the external member such as the waterstop rubber plug adhered to the insulated electric wire while positioning.

Alternatively, defining a region outside the conductor in the cross-section of the low-flatness portion along directions corresponding to the width direction and the height direction of the flat outer shape as a width-directional conductor-outside region and a height-directional conductor-outside region, respectively, the insulated electric wire preferably has a larger vacancy between the conductor and the insulation coating in the width-directional conductor-outside region than in the height-directional conductor-outside region. When forming the low-flatness portion by applying a force to deform the insulated electric wire having the conductor formed into the flat shape, the vacancy is likely to be generated in the low-flatness portion between the conductor and the insulation coating in the width-directional region outside the conductor as the dimension of the conductor in the width direction is reduced. If the insulation coating is not brought into tight contact by heating, the vacancies generated between the conductor and the insulation coating when deforming the conductor are remained as they are. Those vacancies contribute to enhancement of flexibility of the low-flatness portion together with the vacancies generated between the elemental wires.

The insulated electric wire includes a plurality of the flat portions along an axial direction of the insulated electric wire and the low-flatness portion between two of the flat portions. The insulated electric wire having the low-flatness portion at the intermediate part in the axial direction can be suitably used for bending the intermediate part into the complicated shape for the three-dimensional routing.

The insulated electric wire according to the second embodiment of the disclosure is manufactured by steps of making an insulated electric wire by compressing a conductor in which a plurality of elemental wires are twisted together into a flat shape and by covering the outer periphery of the conductor with an insulation coating, thereafter forming a low-flatness portion by applying a force to the insulated electric wire from outside to inside in a width direction of the flat shape in a partial region along an axial direction of the insulated electric wire to reduce the degree of flatness of the conductor; and leaving a region other than the partial region formed into the low-flatness portion as a flat portion.

In the low-flatness portion of the insulated electric wire according to the second embodiment has a difference in flexibility in the bending direction is smaller compared with the flat portion, and therefore, the low-flatness portion can be used for bending into the complicated shape for the three-dimensional routing. The low-flatness portion of the insulated electric wire allows flexible bending into the complicated shape for the three-dimensional routing. The insulated electric wire may be excellent in the degree of freedom in bending and the space-saving property by utilizing the low-flatness portion exhibiting the bending flexibility in the respective directions and the flat portion exhibiting the bending flexibility in the height direction and the space-saving property. The insulated electric wire having the flat and low-flatness portions integrally can be formed easily by applying the insulation coating onto the outer periphery of the flat-shaped conductor to make the insulated electric wire, and then applying a force to deform the insulated electric wire to form the low-flatness portion. It is also possible to arbitrarily form the low-flatness portion at an arbitrary position on the insulated electric wire, which is required in accordance with the specific wiring area.

The wiring harness according to the disclosure includes the insulated electric wire as described in the disclosure. As described above, the low-flatness portion of the insulated electric wire of the disclosure exhibits high bending flexibility in the respective directions as well as the width direction of the flat shape. The low-flatness portion allows the wiring harness to be suitably applied to the area requiring bending of the insulated electric wire into the complicated shape for the three-dimensional routing.

Detailed Description of Embodiment of Disclosure

Referring to the drawings, explanations will be made in detail about an insulated electric wire and a wiring harness according to embodiments of the disclosure. In the specification, each concept of shape and placement of members constituting the insulated electric wire, for example, straight line, parallel, vertical, or the like may have a geometrical error by approximately +/−15% in terms of a length and +/−15° in terms of an angle in an allowable range of the insulated electric wire of the type as described above. In the specification, a cross-section of the insulated electric wire or a conductor represents a cross-section obtained by cutting a wire or the conductor vertically to an axial direction (longitudinal direction).

<Brief Description of Insulated Electric Wire>

Figure 3:
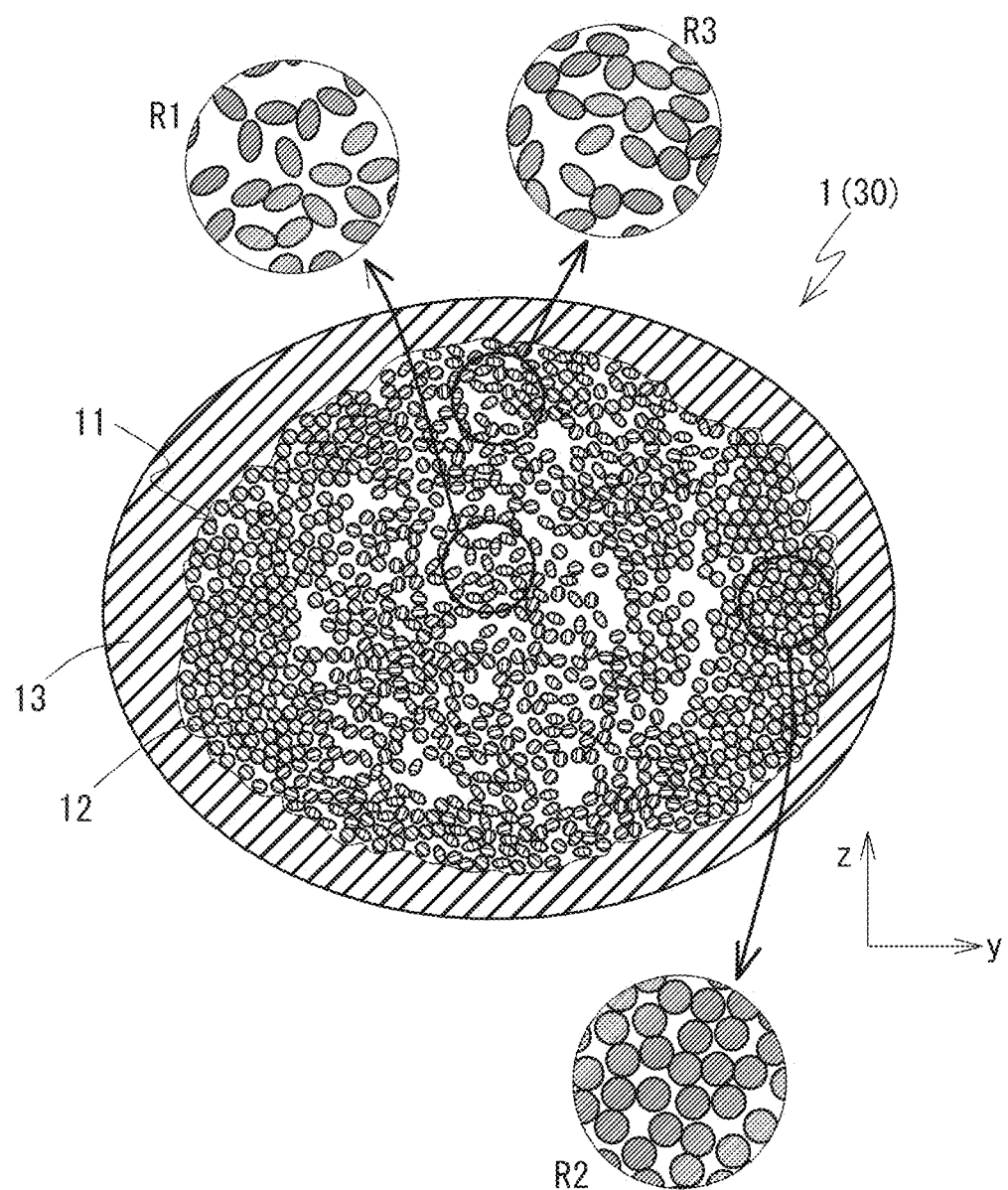
FIG. 3 is a sectional view of the low-flatness portion of the insulated electric wire, and enlarged regions R1 to R3 surrounded by circles, respectively.

FIG. 1A is a perspective view of an insulated electric wire 1 according to an embodiment of the disclosure. FIG. 1B and FIG. 1C are schematic sectional views taken along lines A-A and B-B of FIG. 1A, respectively. FIG. 2 and FIG. 3 illustrate a cross-section of a flat portion corresponding to FIG. 1B, and a cross-section of a low-flatness portion corresponding to FIG. 1C in detail, respectively.

The insulated electric wire 1 according to the embodiment includes a conductor 11 and an insulation coating 13. The conductor 11 contains a twisted wire including a plurality of elemental wires 12 twisted together. The insulation coating 13 is applied to coat an entire outer periphery of the conductor 11. The insulated electric wire 1 includes a flat portion 20 and a low-flatness portion 30 formed along an axial direction (x direction). The flat portion 20 and the low-flatness portion 30 are in an integrally continuous along the axial direction of the insulated electric wire 1. The elemental wires 12 constituting the conductor 11 are in an integrally continuous between the flat portion 20 and the low-flatness portion 30. The insulation coating 13 applied to coat the conductor 11 is also in an integrally continuous between the flat portion 20 and the low-flatness portion 30.

The conductor 11 of the flat portion 20 in the cross-section has a flat outer shape. The flat shape of the conductor 11 represents a state that a width w is longer than a height h, where the width w represents the longest straight line of those crossing across the cross-section parallel to the side or the diameter constituting the cross-section, which covers the entire cross-section, and the height h represents the length of the straight line perpendicular to the line as the width w, which covers the entire cross-section. The cross-section of the conductor 11 may have any specific shape as long as it is flattened. In the embodiment, the cross-section of the conductor 11 has a shape which can be approximated to a rectangle. Besides the rectangular cross-section of the flat shape, the cross-section of the flat shape can be formed into an elliptical shape, an elongated circular shape, an oval shape (both sides of the rectangle are connected by the respective arcs). Preferably, an aspect ratio w/h of the flat portion 20 is in a range from approximately 2 or more and 6 or lower for improving the space-saving property. In the following description, directions corresponding to the width and height directions of the flat shape of the flat portion 20 will be referred to as a width equivalent direction (y direction) and a height equivalent direction (z direction), respectively.

The low-flatness portion 30 has a shape in which the flatness of the conductor 11 is lower than the flat portion 20 in cross-section. The lower flatness of the conductor 11 represents that the aspect ratio w/h of the cross-section of the conductor 11 is low, and the flatness of the cross-sectional shape is low to a certain degree. A specific shape of the low-flatness portion 30 is not necessarily limited, but may be a shape which can be approximated to a rectangle with lower aspect ratio w/h than the flat portion 20, the ellipse, the elongated circle, and the like as well as the square, circle, hexagon, and the shape which can be approximated to that with no anisotropy or little anisotropy. It is preferable that the flatness of the low-flatness portion 30 is as low as possible. Most preferably, the cross-section is shaped to be approximated to the circle or square having the aspect ratio w/h set to 1. An effect for enhancing the bending flexibility (bending property) in the width equivalent direction to be described later can be sufficiently obtained as long as the aspect ratio w/h of the low-flatness portion 30 is set to 2 or lower. The aspect ratio w/h of the low-flatness portion 30 may be set to be in the range from approximately 20% or higher and 70% or lower of the aspect ratio w/h of the flat portion 20. Preferably, the dimension w of the low-flatness portion 30 in the width equivalent direction is not made smaller than the dimension h in the height equivalent direction (w/h 1). That is, preferably, the cross-sectional shape of the low-flatness portion 30 is not formed to have a vertically long shape. The vertically long cross-section, however, may be formed. In such a case, it is preferable to set the aspect ratio h/w of the low-flatness portion 30 to be lower than the aspect ratio w/h of the flat portion 20. If the aspect ratio h/w of the low-flatness portion 30 is set to 2 or lower like the aspect ratio w/h of the horizontally long cross-section as described above so that the flexibility of the low-flatness portion 30 can be enhanced. The aspect ratio h/w of the low-flatness portion 30 may be in the range from approximately 20% or more or 70% or less of the aspect ratio w/h of the flat portion 20.

The insulated electric wire 1 having the flat portion 20 and the low-flatness portion 30 integrally can be suitably manufactured from the base-material flat electric wire having the conductor 11 deformed into the flat shape. A base-material flat electric wire can be manufactured by compressing the conductor 11 with a circular cross-section formed by twisting the plurality of elemental wires 12 into the flat shape, and applying the insulation coating 13 to coat the outer periphery of the conductor 11. In this case, the conductor 11 may be compressed using a roller from both sides in the height direction, and optionally, further compressed from both sides in the width direction as described in Patent Literatures 3 to 5. It is preferable to form the insulation coating 13 to be applied onto the outer periphery of the compressed conductor 11 by executing the extrusion molding of the resin compound. Force is applied from outside the base-material flat electric wire to a part of the region of the thus prepared base-material flat electric wire along the axial direction, specifically, the region required to form the low-flatness portion 30 thereon from outside to inside along the width direction (y direction) so that the conductor 11 is deformed. Application of force reduces the dimension of the conductor 11 in the width direction to lower the flatness of the conductor 11. The low-flatness portion 30 can be formed by the operations as above. Force can be applied by manual processing, or processing using the tool such as the hammer, and the device such as the mold, pressing machine and the like. Preferably, force applied to the conductor 11 is lower than force applied to flatten the conductor 11 upon preparation of the base-material flat electric wire. The region of the base-material flat electric wire other than the region on which the low-flatness portion 30 has been formed by applying force is left as the flat portion 20.

The flat portion 20 of the insulated electric wire 1 according to the embodiment has the flat shape to facilitate routing in the narrow space, and vertical arrangement of other members, resulting in high space-saving property. The conductor 11 constituted by the twisted wire allows the insulated electric wire 1 to be flexibly bent in the height equivalent direction. The flat shape of the flat portion 20 exhibits high flexibility sufficient to bend the insulated electric wire 1 in the height equivalent direction (z direction: flat direction), but exhibits the bending flexibility in the width equivalent direction (y direction: edgewise direction) lower than the height equivalent direction. Meanwhile, in the case of the low-flatness portion 30, as the flatness of the cross-sectional shape of the conductor 11 is low, the difference in flexibility upon bending in the respective directions is small, resulting in high bending flexibility not only in the height equivalent direction but also in the width equivalent direction. The low-flatness portion 30 of the insulated electric wire 1 can be easily deformed by bending into a complicated shape. The use of the low-flatness portion 30 suitably allows routing of the insulated electric wire 1, which involves bending into the complicated shape like the three-dimensional routing in the inner space of the automobile.

According to the embodiment, in the axial direction of the insulated electric wire 1, the position at which the low-flatness portion 30 is formed, and the number of the low-flatness portions 30 to be formed are not specifically limited. The low-flatness portion 30 may be formed at an arbitrary position at which the insulated electric wire is expected to be bent into the complicated shape such as the three-dimensional routing. The low-flatness portion 30 can be formed only by applying force to the base-material flat electric wire from outside the insulation coating 13 to deform the conductor 11. This makes it possible to easily manufacture the insulated electric wire 1 of various types each having a different area requiring formation of the low-flatness portion 30. In a preferred mode, a plurality of flat portions 20 are produced along the axial direction of the insulated electric wire 1 to allow formation of the low-flatness portion 30 between the two flat portions 20. Preferably, the flat portions 20 are formed at both ends of the single insulated electric wire 1 to have the low-flatness portion 30 formed between the flat portions 20. The high space-saving property is exhibited by the flat portion 20 at both end parts of the insulated electric wire 1 where the complicated routing is not required because of the connection points provided to the device. Meanwhile, high flexibility in the respective directions is exhibited by the low-flatness portion 30 at an intermediate part of the insulated electric wire 1 for coping with the complicated routing.

It is preferable for the insulated electric wire 1 according to the embodiment to have a transition region 40 where the outer shape of the conductor 11 changes while continuously inclining (tapered shape) between the flat portion 20 and the non-flatness portion 30 rather than the case where the outer shape changes discontinuously stepwise between the flat portion 20 and the low-flatness portion 30. This makes it possible to prevent generation of the large load or stress exerted to the conductor 11 as a result of abrupt change in the outer shape of the conductor 11 between the flat portion 20 and the non-flatness portion 30.

In the insulated electric wire 1 according to the embodiment, the material and the diameter of each elemental wires 12 constituting the conductor 11, and the cross-sectional area of the conductor are not specifically limited. It is preferable to use the conductor 11 with a large cross-sectional area to a certain degree for enhancing the bending flexibility in the respective directions by forming the low-flatness portion 30. From such point of view, it is preferable to use aluminum or an aluminum alloy for forming the conductor 11 with a large cross-sectional area to be made large because of lower conductivity than copper and a copper alloy. It is preferable for the conductor to have the cross-sectional area equal to or larger than 10 mm², more preferably, 50 mm², and further preferably, 100 mm². For example, an outer diameter of the elemental wires 12 constituting the conductor 11 may be in the range from 0.3 mm or more and 1.0 mm or less.

The insulated electric wire 1 according to the embodiment may be used independently or as the member constituting the wiring harness according to the embodiment of the disclosure. The wiring harness according to the embodiment of the disclosure includes the insulated electric wire 1 of the embodiment. The wiring harness may include plurality of insulated electric wires 1, or insulated electric wires of other types in addition to the insulated electric wire 1 as described above.

<Deformation Ratio of Elemental Wire>

The insulated electric wire 1 of the embodiment, which is manufactured by the method as described above, exhibits the uneven distribution of the deformation ratios of the elemental wires 12 in the cross-section. The deformation ratios of the elemental wires 12 represents an index indicating the degree of deviation of the cross-sectional shape of the elemental wires 12 from a circle. The deformation ratio D of the elemental wires 12 can be expressed by the following formula (1):

$$D=(A-R)/R\times 100\% \qquad (1)$$

where A denotes a long diameter as the longest length of the straight line crossing across the cross-section of the elemental wires 12, and R denotes a diameter of a circle having the same area as the cross-sectional area of the elemental wires 12. When evaluating the deformation ratios of the elemental wires 12 at an area as a part of the cross-section of the conductor 11 such as width-directional end parts and center parts, it is preferable to estimate the deformation ratio by obtaining an average value of the deformation ratios of the plurality of elemental wires 12 in the region having a specific area like the regions R1 to R3 as illustrated in FIG. 2 and FIG. 3 for suppressing the influence of unevenness in de formation of the elemental wires 12. It is possible to set the region surrounded by a rectangle having a side with its length equivalent to approximately 10 to 30% of the width w of the conductor 11, or a circle with its diameter equivalent to the length as described above.

Referring to FIG. 2 and FIG. 3, in both the flat portion 20 and the low-flatness portion 30 of the insulated electric wire 1 according to the embodiment, the deformation ratios of the elemental wires 12 in the width-directional end parts (region R2) corresponding to a region at an outer side (both end parts) of the peripheral end parts of the conductor 11 along the width equivalent direction (y direction) is lower than the deformation ratios of the elemental wires 12 in the center parts (region R1) corresponding to a region at an inner side of the peripheral end parts. That is, in the flat portion 20 and the low-flatness portion 30, the elemental wires 12 in the width-directional end parts are shaped closer to the circle than the elemental wires 12 in the center parts. FIG. 2 and FIG. 3 illustrate the deformation of each elemental wire 12 schematically, and the elemental wires 12 in the center parts of the conductor 11 are deformed to have the flat elliptical shape. However, in the real conductor 11, the elemental wires 12 may be deformed into not only the flat shape, but also an irregular shape as illustrated in the cross-sectional images of FIG. 6A and FIG. 6B, respectively.

When producing the insulated electric wire 1 according to the embodiment from the base-material flat electric wire which includes the flat twisted conductor, the conductor 11 contained in the base-material flat electric wire is deformed into the flat shape by gentle application of force to the twisted wire using a roller. Accordingly, as described in Patent Literatures 3 to 5, the deformation ratios of the elemental wires 12 at the peripheral end parts, especially the width-directional end parts become smaller than the deformation ratios of the elemental wires 12 in the center parts. When manufacturing the insulated electric wire 1 according to the embodiment from the base-material flat electric wire, the flat portion 20 inherits the structure of the conductor 11 contained in the base-material flat electric wire substantially directly. The outer shape of the entire conductor 11 of the low-flatness portion 30 is deformed into the shape with low flatness. However, the elemental wires 12 are not susceptible to such deformation, and are kept substantially unchanged. The low-flatness portion 30 inherits the distribution of the deformation ratios of the elemental wires 12 in the base-material flat electric wire substantially directly. In both the flat portion 20 and the low-flatness portion 30 of the insulated electric wire 1 according to the embodiment, the deformation ratios of the elemental wires 12 in the width-directional end parts become lower than the elemental wires 12 in the center parts correspondingly to the case of the base-material flat electric wire.

In the low-flatness portion 30 and the flat portion 20, no specific limitation is set in the specific ratio of the deformation ratios of the elemental wires 12 in the width-directional end parts to the deformation ratios of the elemental wires 12 in the center parts. Preferably, however, the deformation ratios of the elemental wires 12 in the width-directional end parts are as low as possible. For example, the ratio of the deformation ratios of the elemental wires 12 in the width-directional end parts to the deformation ratios of the elemental wires 12 in the center parts (deformation ratio in width-directional end part/deformation ratio in center part×100%) is preferably 70% or lower, and more preferably, equal to or lower than 50% or lower. Preferably, the values of the deformation ratios of the elemental wires 12 in the width-directional end parts are 10% or lower, and more preferably, 5% or lower. Preferably, the deformation ratios of the elemental wires 12 in the width-directional end parts are as low as possible. The lower limit value is not specifically set.

The deformation ratios of the elemental wires 12 in the center parts is not specifically limited. It is preferable, however, to set the deformation ratios to be 20% or lower, and more preferably, 10% or lower for avoiding application of the load to the elemental wires 12 owing to excessive deformation. Preferably, the deformation ratios in the center parts of both the flat portion 20 and the low-flatness portion 30 are set to be equal to or higher than 5% for effectively flattening the conductor 11 of the flat portion 20 formed directly from the base-material flat electric wire.

In each cross-section of the low-flatness portion 30 and the flat portion 20, preferably, the deformation ratios of the elemental wires 12 in the width-directional end parts are lower than the deformation ratios of the elemental wires 12 not only in the center parts but also in the height-directional end parts corresponding to the outer sides (both ends) of the peripheral end parts of the conductor 11 along the height equivalent direction (z direction). No specific limitation is set in the specific ratio of the deformation ratios of the elemental wires 12 in the width-directional end parts to the deformation ratio in the height-directional end parts. Preferably, however, the ratio of the deformation ratios of the elemental wires 12 in the width-directional end parts to the deformation ratios of the elemental wires 12 in the height-directional end parts (deformation ratio in the width-directional end part/deformation ratio in the height-directional end part×100%) is 70% or lower, and more preferably, 50% or lower, correspondingly to the ratios of the deformation ratios in the width-directional end parts to the deformation ratios in the center parts. The relation of the deformation ratios of the elemental wires 12 between the height-directional end parts and the center parts is not specifically limited.

The insulated electric wire 1 according to the embodiment can be easily produced by the process as below. In the process, the base-material flat electric wire is prepared by applying the insulation coating 13 onto the outer periphery of the conductor 11 having the entire region in the axial direction flattened, and the conductor 11 is deformed in a part of the region of the flat electric wire material in the axial direction. Meanwhile, it is possible to manufacture the insulated electric wire having the region with the flat cross-section and the region with the low-flatness cross-section coexisting by the method in which a part of a region of the twisted wire with a circular cross-section in the axial direction is only deformed into the flat shape, and the insulation coating 13 is applied onto the outer periphery of the conductor with twisted wire. In this case, the region with the low-flatness cross-section is not deformed by applying force to the conductor 11. Accordingly, the cross-sections of the elemental wires 12 in the center parts and the peripheral end parts as a whole are kept in a non-deformation state from the circle. If the insulation coating 13 is formed after deforming only a part of the region of the conductor 11, the position at which the low-flatness region is formed along the axial direction of the insulated electric wire 1 has to be preliminarily determined at the stage for preparing the conductor 11. This process is different from that which allows formation of the low-flatness portion 30 at an arbitrary position afterward.

<Relation Between Conductor and Insulation Coating>

Figure 4:
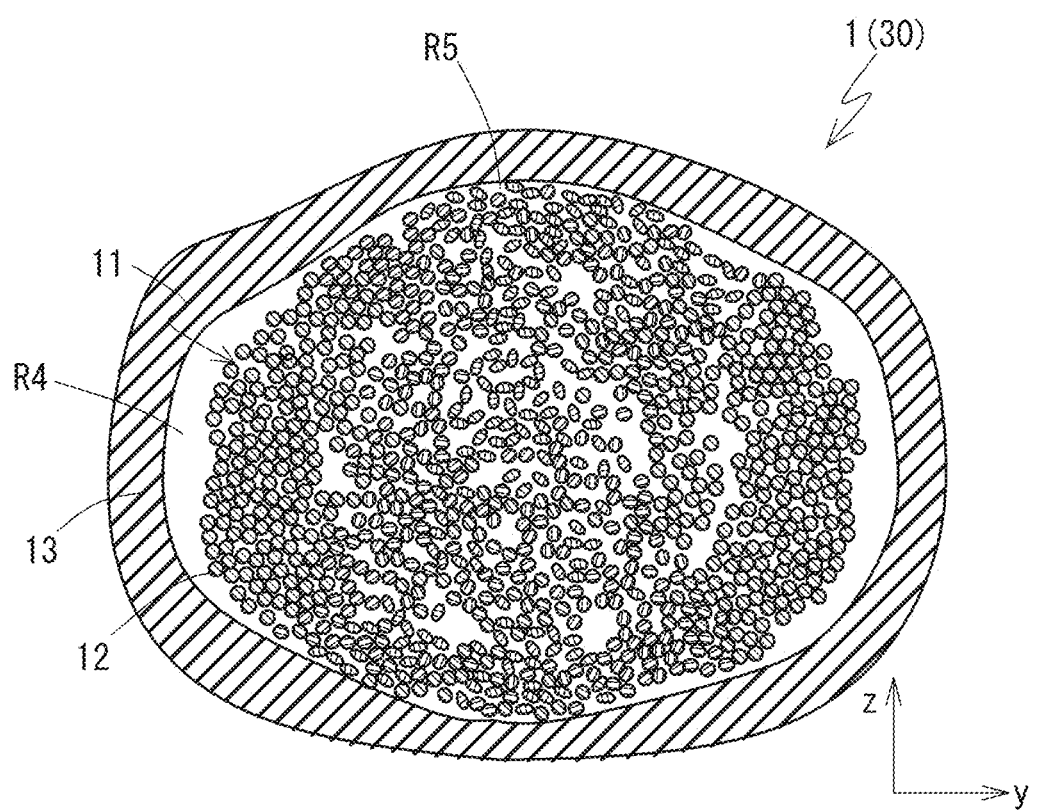
FIG. 4 is a sectional view of the low-flatness portion of an insulated electric wire as a modification.
Figure 4:
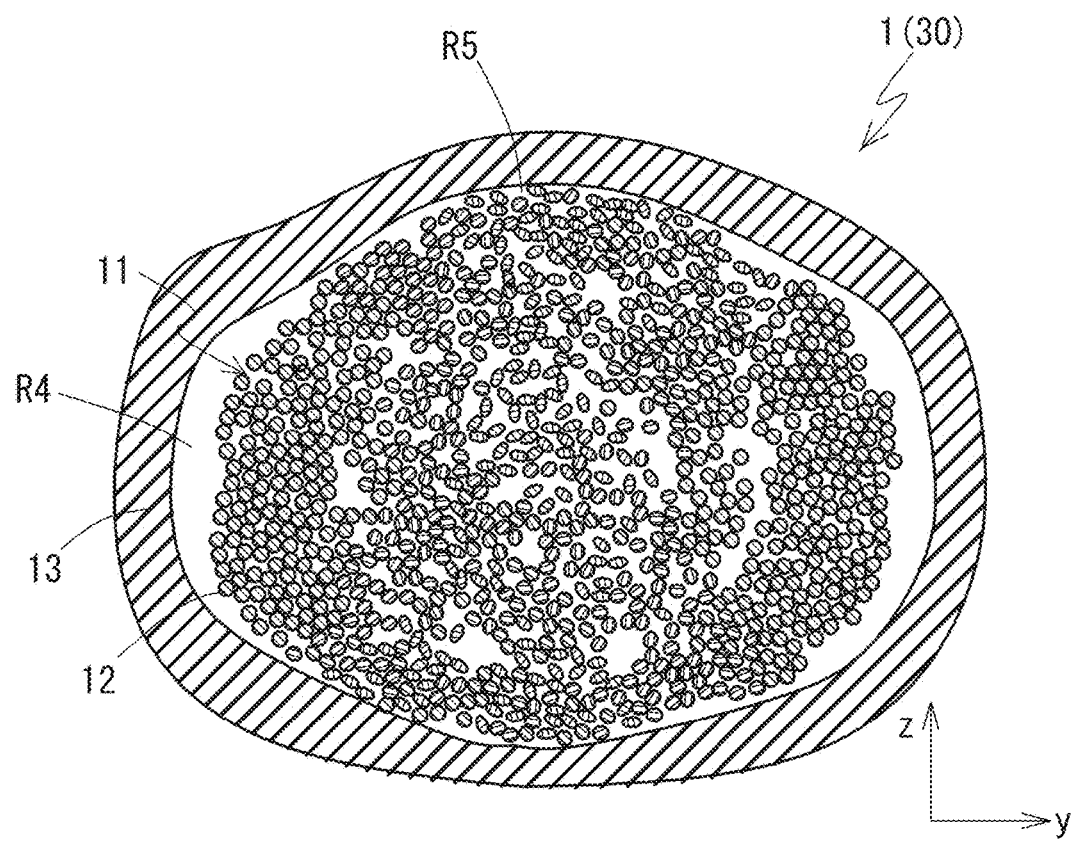

When producing the insulated electric wire 1 having the flat portion 20 and the low-flatness portion 30 according to the embodiment using the base-material flat electric wire formed by applying the insulation coating 13 onto the outer periphery of the flat-shaped conductor 11, in most cases, a vacancy unoccupied by the elemental wires 12 is generated between the conductor 11 and the insulation coating 13 of the low-flatness portion 30 as FIG. 4 illustrates. The vacancy is generated on the ground that, when producing the low-flatness portion 30 by applying the force to the conductor 11 from outside of the base-material flat electric wire, the conductor 11 is deformed, but the length of the inner periphery of the insulation coating 13 is kept substantially unchanged. As the force is applied to the conductor 11 from outside in the width equivalent direction (y direction) to inside so that the conductor 11 is compressed in the width equivalent direction, the vacancy generated in a width-directional region R4 outside the conductor corresponding to a region outside the conductor 11 along the width equivalent direction is likely to become larger than the vacancy generated in a height-directional region R5 outside the conductor corresponding to a region outside the conductor 11 along the height equivalent direction. In the width-directional region R4 outside the conductor, the distance between the conductor 11 and the inner peripheral surface of the insulation coating 13 is likely to be longer than the distance in the height-directional region R5 outside the conductor, resulting in uneven distribution of the vacancy in the width-directional region R4 outside the conductor. The uneven distribution of the vacancy may also occur in the width-directional region R4 outside the conductor not only in the low-flatness portion 30 but also in the boundary between the low-flatness portion 30 and the flat portion 20.

Referring to the low-flatness portion 30 as illustrated in FIG. 4, the insulation coating 13 is not adhered to the outer periphery of the conductor 11. Especially, in the width-directional region R4 outside the conductor, the vacancy is kept between the conductor 11 and the insulation coating 13. The insulated electric wire 1 according to the embodiment may be used while keeping the vacancy in the state as described above. As described in detail later, the vacancy between the conductor 11 and the insulation coating 13 contributes to enhancement of flexibility of the low-flatness portion 30. While producing the low-flatness portion 30 by deforming the conductor 11 of the base-material flat electric wire prepared by forming the insulation coating 13 onto the outer periphery of the flat conductor 11 through extrusion molding, or after producing the low-flatness portion 30 by deforming the conductor 11, the insulation coating 13 may be heated in the region including the low-flatness portion 30 for temporarily softening or melting. The insulation coating 13 in the softened or melted state is then pressed against the conductor 11 under the force using a mold or the like. This makes it possible to bring the insulation coating 13 into tight contact with the outer periphery of the conductor 11. As FIG. 2 and FIG. 3 illustrate, after cooling, the insulation coating 13 is adhered to the outer periphery of the conductor 11 both in the flat portion 20 and the low-flatness portion 30. As the insulation coating 13 is brought into tight contact with the conductor 11, an air layer is prevented from intervening between the insulation coating 13 and the conductor 11. This makes it possible to efficiently dissipate the heat generated upon current application to the conductor 11 to the outside via the insulation coating 13.

In the case where the insulated electric wire 1 has the transition region 40 when the outer shape of the conductor 11 varies while continuously inclining between the flat portion 20 and the low-flatness portion 30, in association with bringing the insulation coating 13 into tight contact with the outer periphery of the conductor 11 of the low-flatness portion 30, the insulation coating 13 is also brought into tight contact with the outer periphery of the conductor 11 in the transition region 40. Preferably, the entire outer shape of the insulated electric wire 1 including the insulation coating 13 varies while inclining continuously. This makes it possible to suppress generation of the large load or stress exerted not only to the conductor 11 but also the insulation coating 13 owing to the abrupt change in the outer shape in the region between the flat portion 20 and the low-flatness portion 30. In this case, the insulated electric wire 1 has the section between the flat portion 20 and the low-flatness portion 30 connected while being gently inclined. This allows the external member such as the waterstop rubber plug to be positioned at the predetermined area along the axial direction of the insulated electric wire 1, and fitted in tight contact with the outer periphery of the insulated electric wire 1.

When producing the low-flatness portion 30 by applying force from outside the base-material flat electric wire, the conductor 11 is deformed, but the inner peripheral length of the insulation coating 13 is kept substantially unchanged. This results in the characteristic that the difference in the outer peripheral length of the cross-section of the conductor 11 is unlikely to occur between the low-flatness portion 30 and the flat portion 20 in addition to the characteristic that the vacancy unevenly exists between the conductor 11 and the insulation coating 13 in the width-directional region R4 outside the conductor for the following reason. That is, it is difficult to largely change the outer peripheral length of the conductor 11 which is limited by the inner peripheral length of the insulation coating 13 when deforming the conductor 11 to form the low-flatness portion 30. In the cross-section of the resultant insulated electric wire 1, the ratio of the difference in the outer peripheral length of the conductor 11 between the flat portion 20 and the low-flatness portion 30 to the outer peripheral length of the conductor 11 of the flat portion 20 becomes 5% or lower, for example. In other words, the peripheral length difference ratio $\Delta L$ as expressed by the following formula (2) is 5% or lower.

$$\Delta L = |L1 - L2|/L1 \tag{2}$$

where L1 denotes the outer peripheral length of the conductor 11 of the flat portion 20, and L2 denotes the outer peripheral length of the conductor 11 of the low-flatness portion 30. The outer peripheral length of the conductor 11 may be evaluated as the length of the contour line by smoothly tracing contours of the elemental wires 12 arranged at the outermost periphery of the conductor 11 in the cross-section. The state where the peripheral length difference ratio $\Delta L$ is 5% or lower, that is, the difference in the outer peripheral length of the conductor 11 between the flat portion 20 and the low-flatness portion 30 becomes small can be held in the low-flatness portion 30 when the insulation coating 13 is heated to be brought into tight contact with the outer periphery of the conductor 11. If the insulation coating 13 is not brought into tight contact with the conductor 11 by heating, the peripheral length difference ratio $\Delta L$ may be evaluated using the inner peripheral length of the insulation coating 13 instead of the outer peripheral lengths L1, L2 of the conductor 11.

<Vacancy Ratio of Insulated Electric Wire>

In the insulated electric wire 1 according to the embodiment, preferably, in the cross-section of the low-flatness portion 30, a vacancy ratio is higher than the flat portion 20. The vacancy ratio represents the ratio of the area of vacancy unoccupied by the elemental wires 12 to the area of the region surrounded by the inner periphery of the insulation coating 13 in the cross-section of the insulated electric wire 1.

In the cross-section of the insulated electric wire 1, when many vacancies are generated to increase the vacancy ratio, the elemental wires 12 move to the vacancy upon bending of the conductor 11 to assist the flexible bending of the insulated electric wire 1. The low-flatness portion 30 having the vacancy ratio higher than the flat portion 20 provides the effect of further enhancing the bending flexibility in the respective directions in addition to the effect derived from the outer shape of the cross-section with low flatness. This allows the insulated electric wire 1 to be easily bent into the complicated shape utilizing the low-flatness portion 30.

As described above, when producing the low-flatness portion 30 by applying force from outside to inside in the width direction to deform the conductor 11 in a part of the region of the base-material flat electric wire having the insulation coating 13 applied to the outer periphery of the flat-shaped conductor 11, the vacancy ratio in the low-flatness portion 30 is likely to increase the vacancy ratio higher than the flat portion 20. As the relation between the conductor 11 and the insulation coating 13 has been described, the inner peripheral length of the insulation coating 13 in the cross-section before deformation is kept substantially unchanged after the deformation. The inner peripheral length of the insulation coating 13 limits the change in the outer peripheral length of the conductor 11. If the outer peripheral length is the same, the area of the region surrounded by the outer periphery of the shape with low flatness is larger than the area in the case of the shape with high flatness. In other words, compared with the flat portion 20, the low-flatness portion 30 has more rooms for increasing the area of the region surrounded by the outer periphery of the conductor 11. The area occupied by the elemental wires 12 is constant in the region surrounded by the outer periphery of the conductor 11. If the area of the region surrounded by the outer periphery of the entire conductor 11 of the low-flatness portion 30 is increased, the area occupied by the vacancy of the inner side of the region, that is, the vacancy ratio is increased. For the reason as above, the low-flatness portion 30 produced by deforming the base-material flat electric wire is likely to make the vacancy ratio in the cross-section higher than the vacancy ratio in the cross-section of the flat portion 20.

As described with respect to the relation between the conductor 11 and the insulation coating 13, when the low-flatness portion 30 produced by deforming the conductor 11 of the base-material flat electric wire is kept as it is, the low-flatness portion 30 is likely to generate the vacancy between the outer periphery of the conductor 11 and the insulation coating 13. Specifically, the vacancy is likely to be distributed unevenly in the width-directional region R4 outside the conductor. The vacancy generated outside the conductor 11 also contributes to enhancement of flexibility of the conductor 11 as a result of movement of the elemental wires 12. In the cross-section of the insulated electric wire 1, the vacancy ratio of the low-flatness portion 30 in the entire region surrounded by the inner periphery of the insulation coating 13 (vacancy ratio of the entire region) including the vacancy generated in the outer periphery of the conductor 11 may be higher than the vacancy ratio of the flat portion 20. The vacancy generated inside the outer periphery of the conductor 11, that is, the vacancy between the elemental wires 12 constituting the conductor 11 becomes highly effective for enhancement of the bending flexibility of the conductor 11. It is further preferable that the vacancy ratio (vacancy ratio in the conductor) with respect only to the vacancy generated inside the outer periphery of the conductor 11 of the low-flatness portion 30 is higher than the vacancy ratio of the flat portion 20. The distribution of the vacancy inside the outer periphery of the conductor 11, and the vacancy ratio of the conductor resulting from contribution of the vacancies are substantially held even after bringing the insulation coating 13 into tight contact with the conductor 11 by heating.

The vacancy ratio of the low-flatness portion 30 (vacancy ratio in entire region, which applies to the description in this paragraph) is not specifically limited. Preferably, the ratio Vr of the vacancy ratio of the low-flatness portion 30 to the vacancy ratio of the flat portion 20 as expressed by the following formula (3) is 1.2 or more:

$$Vr = V2/V1 \quad (3)$$

where V1(%) denotes the vacancy ratio of the flat portion 20, and V2(%) denotes the vacancy ratio of the low-flatness portion 30. It is more preferable that the ratio Vr of the vacancy ratio is 1.5 or higher, or 2.0 or higher. It is preferable that the value (V2) of the vacancy ratio of the low-flatness portion 30 is 35% or higher, more preferably, 40% or higher, and furthers preferably, 45% or higher. This makes it possible to easily secure the higher flexibility in the low-flatness portion 30. Preferably, the vacancy ratio (V1) of the flat portion 20 is equal to or higher than 10% for securing the bending flexibility in the height equivalent direction. The upper limit of the vacancy ratio (V1, V2) is not specifically set in terms of flexibility. However, in the case of the flat portion 20 and the low-flatness portion 30, the respective vacancy ratios may be set to substantially equal to or lower than 50% for stably holding the predetermined outer shape of the conductor 11.

Example

Examples will be described hereinafter. The present invention is not limited to those examples.

[1] Shape of Conductor and Bending Flexibility of Insulated Electric Wire

A comparison was made with respect to the bending flexibility between existence and non-existence of the low-flatness portion on a flat electric wire.

(Preparation of Sample)

Firstly, the flat electric wire was produced. A twisted wire having a circular cross-section was prepared by twisting aluminum alloy elemental wires. A conductor was produced by compressing the twisted wire into the flat shape using a roller. The twisted wire having the conductor cross-sectional area of 130 mm$^2$, and the elemental wire diameter of 0.42 mm was used. The aspect ratio w/h of a flat shape was set to approximately 3. An insulation coating was applied onto the outer periphery of the produced conductor by extrusion molding. A crosslinked polyethylene was used for forming the insulation coating with thickness of 2 mm.

The flat electric wire made as above was used as one of samples. As another sample, the electric wire having the low-flatness portion was produced from the flat electric wire as described above. Force was applied to an intermediate region of the flat electric wire, having a length of 6 cm along an axial direction from outside to inside of the flat shape in a width direction. The low-flatness portion was formed by reducing the flatness of the flat shape of the conductor. The aspect ratio w/h of the conductor of the low-flatness portion was set to approximately 1. After forming the low-flatness portion, the area of the electric wire including the low-flatness portion was heated to bring the insulation coating into tight contact with the conductor.

(Evaluation Method)

Figure 5:
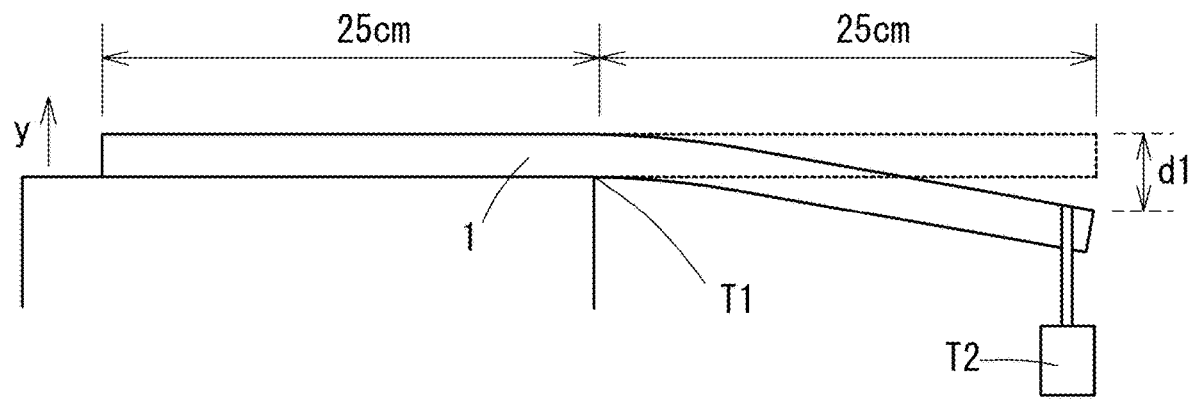
FIG. 5 is an explanatory view of a method for evaluating flexibility of the insulated electric wire in a test [1].

Flexibility of each of the insulated electric wires produced as described above was evaluated. In the evaluation process, as FIG. 5 illustrates, a weight T2 of 500 g was attached to one end of an insulated electric wire 1 cut into a section with the length of 50 cm. The cut wire was held in the horizontal direction by setting the position 25 cm from the other end as a fulcrum T1 (indicated by a broken line). The width equivalent direction (y direction) of the flat shape of the insulated electric wire 1 was disposed in the gravity direction so that the insulated electric wire 1 was bent in the width equivalent direction by the gravity of the weight T2. The electric wire with low-flatness portion has the fulcrum T1 set in a center of the region where the low-flatness portion was formed. For the respective insulated electric wires 1, a hang-down distance d1 of the end with the weight T2 from the horizontal position under the gravity of the weight T2 was measured.

(Evaluation Result)

Table 1 shows each hang-down distance d1 measured at each end of the flat electric wire and the electric wire with low-flatness portion, respectively.

TABLE 1

|  | flat electric cable | electric cable with low-flatness portion |
| --- | --- | --- |
| hang-down distance d1 | 45 cm | 95 cm |

Referring to Table 1, the hang-down distance of the weighted end of the electric wire with low-flatness portion is twice or longer than the flat electric wire. This indicates that the electric wire with low-flatness portion has the bending flexibility in the width equivalent direction higher than the flat electric wire. The electric wire with low-flatness portion is derived from lowering the flatness of a region as a part of the flat electric wire. However, this is highly effective for enhancing the bending flexibility in the width equivalent direction.

[2] Deformation of Elemental Wire of Conductor

A comparison is made with respect to deformation of the elemental wire constituting the conductor between the flat portion and the low-flatness portion.

(Preparation of Sample)

Like the test [1], the low-flatness portion was formed on the intermediate part of the flat electric wire in the axial direction to produce the electric wire with low-flatness portion. In this case, the insulation coating was not brought into tight contact with the conductor by heating after formation of the low-flatness portion. The cross-sectional area of the conductor was 130 mm$^2$, the aspect ratio w/h of the conductor of the flat portion was approximately 3, and the aspect ratio of the conductor of the low-flat portion was approximately 1. The resultant electric wire with low-flatness portion was embedded in the acrylic resin, and fixed. The wire was then cut in the direction vertical to the axial direction in the flat portion and the low-flatness portion to provide the cross-section samples.

(Evaluation Method)

Each of the cross-section samples of the flat portion and the low-flatness portion was subjected to the microscope observation to evaluate deformation of the elemental wire in the cross-section. Especially, in the low-flatness portion, the deformation ratios of the elemental wires were quantitatively evaluated with respect to the representative parts using the microscope images of the cross-sections. Specifically, each diameter of the elemental wires in the predetermined region was measured to estimate the elemental wire deformation ratio (D) by the formula (1). An average value of the elemental wire deformation ratio in the respective regions was recorded.

(Evaluation Result)

Figure 6:
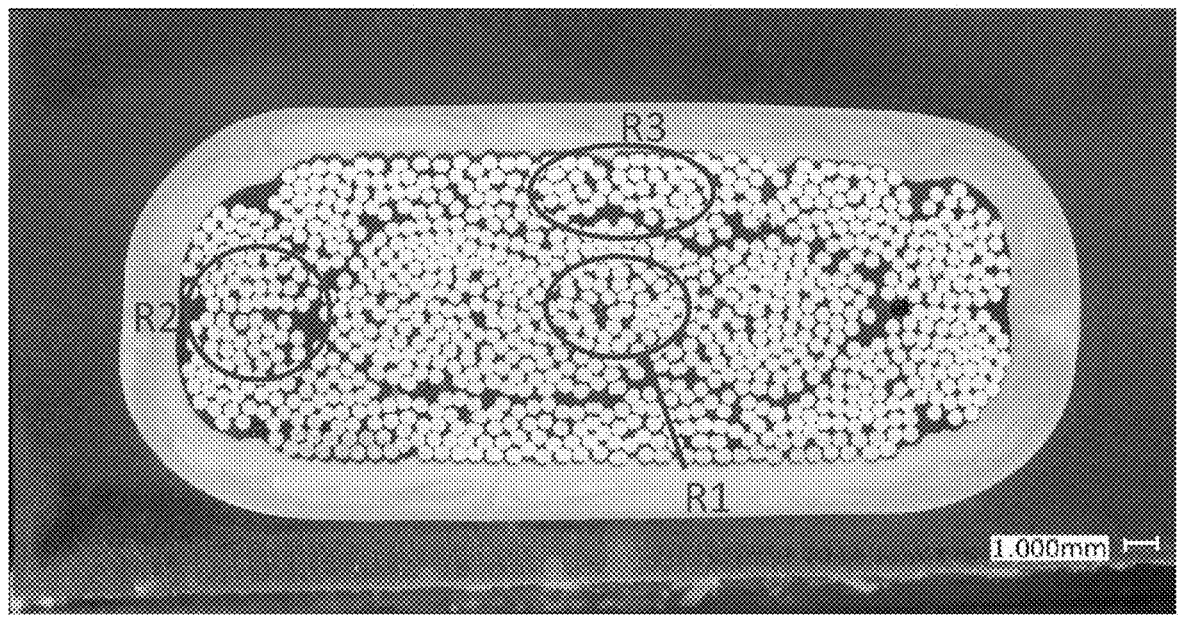
FIG. 6A and FIG. 6B are images as a result of detailed observation of cross-sections of the flat portion and the low-flatness portion of the insulated electric wire in a test [2].
Figure 6:
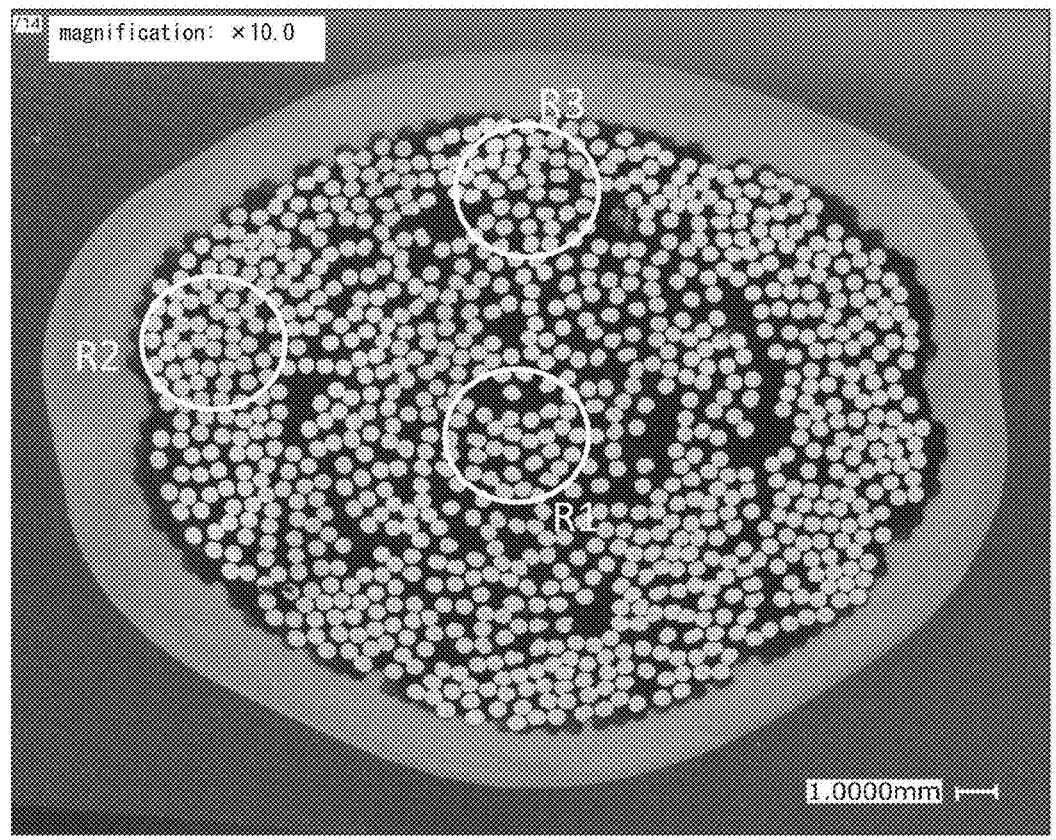

FIG. 6A and FIG. 6B show photographed images of cross-sections of the flat portion and the low-flatness portion. Table 2 shows results of evaluating the elemental wire deformation ratio of the low-flatness portion at the respective parts.

TABLE 2

|  | center part R1 | width-directional end parts | height-directional end parts |
| --- | --- | --- | --- |
| elemental wire deformation ratio D | 7.5% | 3.2% | 9.0% |

Referring to the cross-section of the flat portion in FIG. 6A, the elemental wires in the center parts of the conductor shown as a region R1 are significantly deformed from the circle. The elemental wires in the width-directional end parts shown as a region R2 have the shape kept closer to the circle. This indicates that the deformation ratios of the elemental wires in the width-directional end parts are lower than the deformation ratios in the center parts. A large number of elemental wires in the height-directional end parts shown as a region R3 are deformed from the circle. This indicates that the deformation ratio of the elemental wires in the width-directional end parts becomes lower than the deformation ratios in the height-directional end parts. This is considered to have been caused by gentle deformation of the entire conductor using a roller into the flat shape to prevent large deformation of the elemental wires in the width-directional end parts from the circle.

Referring to the cross-section of the low-flatness portion in FIG. 6B, similar to the flat portion, the elemental wires in the center parts of the conductor shown as the region R1 are significantly deformed into the flat shape from the circle. Meanwhile, the elemental wires 12 in the width-directional end parts shown as the region R2 have a shape kept closer to the circle, which indicates that the elemental wire deformation ratio in the width-directional end parts are lower than the deformation ratios in the center parts. This finding is further clarified by Table 2 showing the result of quantitative analysis of each elemental wire deformation ratio in the regions R1 and R2. The value of the elemental wire deformation ratio in the width-directional end parts R2 is equal to or lower than half the value of the center parts R1. The absolute values of the elemental wire deformation ratio in the width-directional end parts R2 is as small as 5% or lower.

Referring to FIG. 6B, a large number of elemental wires in the height-directional end parts shown as a region R3 are deformed from the circle, which indicates that the elemental wire deformation ratio in the width-directional end parts is lower than the elemental wire deformation ratio in the height-directional end parts. Table 2 shows that the elemental wire deformation ratio in the width-directional end parts R2 takes a small value which is equal to or lower than half the value of the height-directional end parts R3.

From the results as described above, it is confirmed that the low-flatness portion inherits the characteristics of the flat portion, that the elemental wire deformation ratio in the width-directional end parts of the conductor are lower than the deformation ratios in both the center parts and the height-directional end parts byway of deformation of the conductor by application of the force from both sides in the width direction.

[3] Outer Peripheral Length of Conductor and Vacancy Ratio (Preparation of Sample)

Like the test [1], the low-flatness portion was formed on the intermediate part of the flat electric wire in the axial direction to produce the electric wire with the low-flatness portion. In this case, the insulation coating was not brought into tight contact with the conductor by heating after formation of the low-flatness portion. Three kinds of flat electric wires each having the conductor cross-sectional area of 15 mm$^2$, 60 mm$^2$, 130 mm$^2$, respectively, were used. The aspect ratio w/h of the conductor of the flat portion was approximately 3, and the aspect ratio of the low-flatness portion was approximately 1. The thickness of the insulation coating of the sample with the conductor cross-sectional area of 15 mm$^2$ was 1 mm. Each thickness of the insulation coating of other two samples was 2 mm. Similar to the test

[2], each cross-section sample of both the flat portion and the low-flatness portion of the manufactured insulated electric wires was prepared. The flat electric wire used as the base material for producing the electric wire with low-flatness portion in the test [3] exhibits higher contactness of the insulation coating with the conductor compared with that used in the test [2].

(Evaluation Method)

Each microscope image of the cross-section samples was taken for measuring the outer peripheral length of the conductor and the vacancy ratio by analyzing the image. As for the outer peripheral length of the conductor, the outer periphery of the conductor in the image was gently traced to set the contour line so that the length of the contour line was measured. As for the vacancy ratio, a rate of the total area of regions unoccupied by the elemental wires to the area of the region inside the insulation coating was calculated.

(Evaluation Result)

Figure 7:
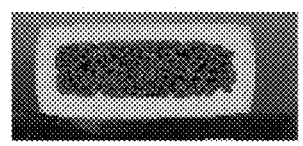
FIG. 7A to FIG. 7C show cross-sections of the flat portions (left) and the low-flatness portions (right) of the insulated electric wires each having the conductor with cross-sectional area of 15 mm$^2$, 60 mm$^2$, and 130 mm$^2$, respectively.
Figure 7:
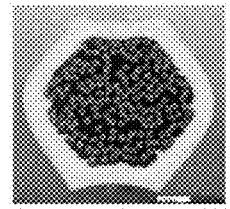
Figure 7:
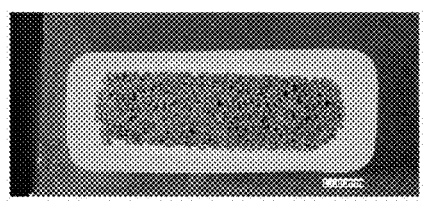
Figure 7:
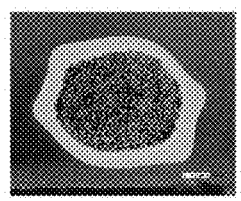
Figure 7:
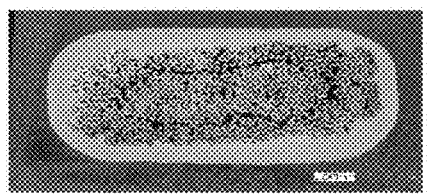
Figure 7:
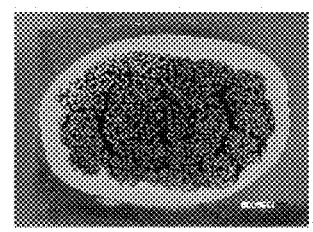

FIG. 7A to FIG. 7C show images of cross-sections of the flat portion and the low-flatness portion of the respective insulated electric wires. The left images represent the cross-sections of the flat portions, and the right images represent the cross-sections of the low-flatness portions in the case of three kinds of the insulated electric wires each having the conductor cross-sectional area of 15 mm$^2$, 60 mm$^2$, and 130 mm$^2$, respectively. Table 3 shows values of the outer peripheral length of the conductor and the vacancy ratios of the flat portion and the low-flatness portion derived from the samples, respectively. Table 3 shows each value of the peripheral length difference ratio ΔL obtained by the formula (2) with respect to the outer peripheral length of the conductor, and each value of the ratio Vr of the vacancy ratio obtained by the formula (3) with respect to the vacancy ratio.

tor, and change in the outer peripheral length of the conductor is limited by the inner peripheral length of the insulation coating. The outer peripheral length of the conductor as shown in Table 3 represents the length of the contour line formed by smoothly tracing the outer periphery of the conductor as described above. It has been confirmed that the thus obtained outer peripheral length substantially coincides with the value obtained by binarizing the inner region of the insulation coating in each image of the samples, and analyzing the outer peripheral length of the region corresponding to the elemental wire.

Table 3 indicates that, in the respective samples, each vacancy ratio of the low-flatness portion is larger than the flat portion as indicated by the cross-sectional images of FIG. 7A to FIG. 7C. The ratio of the vacancy ratio of each sample is equal to or higher than 2.0. In other words, the vacancies which occupy the low-flatness portion of the electric wire in cross-section accounts for a larger proportion than the case of the flat portion twice or more. The result reflects the characteristic that the area of the region surrounded by the outer periphery with the same length becomes larger as the flatness of the shape becomes lower. Using the flat portion of the sample with the conductor cross-sectional area of 130 mm$^2$, the vacancy ratios of the plurality of areas of the plurality of samples are evaluated as well. An error which occurs in the vacancy ratio value results in approximately 5% as a maximum value. The significance of the difference in the vacancy ratio between the flat portion and the low-flatness portion as shown in Table 3 has been confirmed.

TABLE 3

| | peripheral length of conductor | | | vacancy ratio | | |
|---|---|---|---|---|---|---|
| conductor cross-sectional area | flat portion L1 | low-flatness portion L2 | peripheral length difference ratio ΔL = \|L1 − L2\|/L1 | flat portion V1 | low-flatness portion V2 | ratio of vacancy ratio Vr = V2/V1 |
| 15 mm$^2$ | 21.2 mm | 20.5 mm | 3.30% | 18% | 49% | 2.7 |
| 60 mm$^2$ | 40.0 mm | 42.7 mm | 6.75% | 12% | 42% | 3.5 |
| 130 mm$^2$ | 66.8 mm | 65.7 mm | 1.65% | 21% | 44% | 2.1 |

Referring to any of the sample images shown in FIG. 7A to FIG. 7C, the insulation coating is adhered to an entire region of the outer periphery of each conductor of the flat portion and the low-flatness portion. In any of the samples, it is observed that the vacancies generated between the elemental wires of the low-flatness portion are more than those of the flat portion. Especially, the significant difference in the vacancy amount between the low-flatness portion and the flat portion is observed in the sample having the small conductor cross-sectional area.

Referring to Table 3, in any of the samples, the outer peripheral lengths of the conductors of the flat portion and the low-flatness portion take values close to each other. The peripheral length difference ratio takes the value as small as 5% or lower. This indicates that formation of the low-flatness portion by deforming the conductor keeps the outer peripheral length of the conductor substantially unchanged. It is considered that the result is obtained on the ground that the low-flatness portion is formed by deforming the conductor from the state where the insulation coating has been applied onto the outer periphery of the flat-shaped conduc-

[4] Vacancy Between Conductor and Insulation Coating

Research was conducted about the vacancy distribution generated between the conductor and the insulation coating by deforming the flat electric wire to produce the low-flatness portion.

(Preparation of Sample)

The sample used for the test [2] was also used for this test. The insulated electric wire to be prepared as the sample was embedded and fixed in the acrylic resin. The wire was cut at areas of the flat portion, the low-flatness portion, and a boundary between the flat portion and the low-flatness portion to prepare the cross-section samples.

(Evaluation Method)

Microscope images of cross-section samples prepared by cutting the insulated electric wire at the respective positions were taken. Like the test [3], the vacancy ratio was measured by analyzing the image.

(Evaluation Result)

Figure 8:
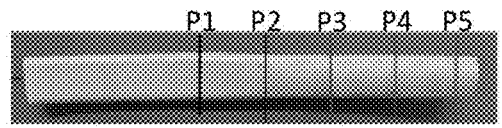
FIG. 8A represents a photograph of an appearance of the insulated electric wire used as a sample in a test [4].
FIG. 8B represents images of cross-sections derived from cutting the insulated electric wire as the sample at positions P1 to P5 as shown in FIG. 8A, respectively.
Figure 8:
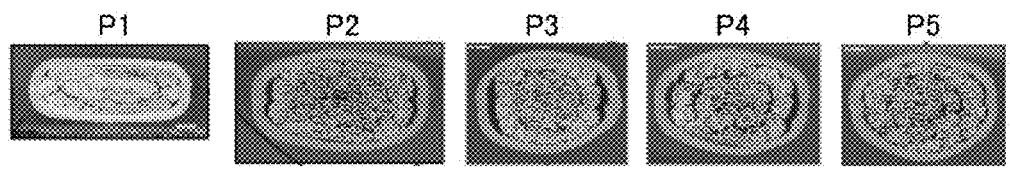

FIG. 8A shows a photograph of appearance of the insulated electric wire used as the sample. The photograph is taken from the direction facing the flat surface of the flat portion. The flat portion is located at the left side, and the low-flatness portion is located at the right side. The image of the photograph includes positions at which the cross-section samples are obtained by cutting. FIG. 8B shows microscope images of the cross-sections at the respective positions. Codes marked above the images correspond to the cutting positions P1 to P5 shown in FIG. 8A. The position P1 corresponds to the flat portion, the position P2 corresponds to the boundary between the flat portion and the low-flatness portion, and the positions P3 to P5 correspond to the low-flatness portion. The cross-sectional images for analyzing the deformation ratio of the elemental wire in the test [2] correspond to the cross-sections marked with the P1 and P5.

As the cross-sectional images of FIG. 8B indicate, in the boundary area at the position P2, and areas of the low-flatness portion at the positions P3 to P5 in the width direction corresponding to the lateral direction of the image, the vacancy which is larger than the height direction is generated. Uneven distribution of the vacancy in the width-directional region outside the conductor is attributable to reduction in the widthwise dimension of the conductor by applying force to the flat conductor from outside to inside in the width direction upon formation of the low-flatness portion. The uneven distribution of the vacancy in the width-directional region outside the conductor is particularly notable at the positions P3, P4 near the boundary of the low-flatness portion.

Table 4 shows each vacancy ratio in the cross-sections at the respective positions. Because of difference in the contactness between the conductor and the insulation coating of the flat electric wire as the base material, values of the vacancy ratios of the flat portion and the low-flatness portion in Table 4 are larger than the values shown in Table 3. Similar to Table 3, the results in Table 4 show that the vacancy ratio of the low-flatness portion is higher than the vacancy ratio of the flat portion. The vacancy ratio in the boundary area takes the value close to that of the low-flatness portion.

TABLE 4

|  | flat portion | boundary area | low-flatness portion | | |
| --- | --- | --- | --- | --- | --- |
|  | P1 | P2 | P3 | P4 | P5 |
| vacancy ratio | 30% | 42% | 46% | 45% | 48% |

The embodiments of the disclosure have been described in detail. The present invention is not limited to the embodiments as described above, but may be variously modified without departing from the scope of the present invention.

LIST OF REFERENCE SIGNS

1: insulated electric wire
11: conductor
12: elemental wire
13: insulation coating
20: flat portion
30: low-flatness portion
40: transition region
d1: hang-down distance
h: height of conductor
w: width of conductor
x: axial direction of insulated electric wire
y: width equivalent direction
z: height equivalent direction
P1 to P5: cutting position
R1: region of center parts
R2: region of width-directional end parts
R3: region of height-directional end parts
R4: width-directional region outside conductor
R5: height-directional region outside conductor
T1: fulcrum
T2: weight

The invention claimed is:

1. An insulated electric wire, comprising:
a conductor comprising a plurality of elemental wires twisted together; and
an insulation coating covering an outer periphery of the conductor, wherein
the insulated electric wire includes both a flat portion and a low-flatness portion concurrently along an axial direction of the insulated electric wire, where the plurality of elemental wires and the insulation coating are each continuous through these portions;
the conductor has, in a cross-section perpendicular to the axial direction, a flat outer shape in the flat part and a less flat outer shape in the low-flatness portion than in the flat portion in the insulated electric wire;
in the cross-sections of the conductor for both of the flat and the low-flatness portions, deformation ratios of the elemental wires at width-directional end parts, which correspond to regions facing an outer periphery of the conductor at both ends in a width direction, are lower than the deformation ratios of the elemental wires at center parts of the conductor.

2. The insulated electric wire according to claim 1 wherein in the cross-sections of the conductor for both of the flat and the low-flatness portions, the deformation ratios of the elemental wires at the width-directional end parts are lower than the deformation ratios of the elemental wires at height-directional end parts, which correspond to regions facing an outer periphery of the conductor at both ends of the flat shape in a height direction.

3. The insulated electric wire according to claim 1, wherein in the low-flatness portion, the deformation ratios of the elemental wires at the width-directional end parts are 70% or lower than the deformation ratios at the center parts.

4. The insulated electric wire according to claim 1, wherein in the low-flatness portion, the deformation ratios of the elemental wires at the center parts are 5% or higher.

5. The insulated electric wire according to claim 1, wherein a vacancy ratio in the low-flatness portion is higher than the vacancy ratio in the flat portion, defining that the vacancy ratio is a proportion of an area of vacancy not occupied by the elemental wires to an area of a region surrounded by an inner periphery of the insulation cover in the cross-section.

6. The insulated electric wire according to claim 1, wherein difference in length of the outer periphery of the conductor between the flat portion and the low-flatness portion is within 5% of the length of the outer periphery of the conductor in the flat portion.

7. The insulated electric wire according to claim 1, wherein the insulation cover is adhered to the outer periphery of the conductor in both the flat and low-flatness portions.

8. The insulated electric wire according to claim 7, wherein the insulated electric wire has a transition region where an outer shape of the conductor changes continuously inclining between the flat and low-flatness portions; and
the insulation cover is adhered to the outer periphery of the conductor in the transition region.

9. The insulated electric wire according to claim 1, wherein
defining a region outside the conductor in the cross-section of the low-flatness portion along directions corresponding to the width direction and the height direction of the flat outer shape as a width-directional conductor-outside region and a height-directional conductor-outside region, respectively, and
the insulated electric wire has a larger vacancy between the conductor and the insulation coating in the width-directional conductor-outside region than in the height-directional conductor-outside region.

10. The insulated electric wire according to claim 1, comprising:
a plurality of the flat portions along an axial direction of the insulated electric wire; and
the low-flatness portion between two of the flat portions.

11. A wiring harness comprising the insulated electric wire according to claim 1.

12. An insulated electric wire manufactured by steps of:
making an insulated electric wire by compressing a conductor in which a plurality of elemental wires are twisted together into a flat shape and by covering an outer periphery of the conductor with an insulation coating;
thereafter forming a low-flatness portion by applying a force to the flat shaped insulated electric wire from outside to inside in a width direction of the flat shape in a partial region along an axial direction of the insulated electric wire to reduce the degree of flatness of the conductor; and
leaving a region other than the partial region formed into the low-flatness portion as a flat portion.

* * * * *